United States Patent
Yukawa

(10) Patent No.: US 8,276,631 B2
(45) Date of Patent: *Oct. 2, 2012

(54) METHOD FOR MANUFACTURING LOW NOISE PNEUMATIC TIRE

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 387 days.

This patent is subject to a terminal disclaimer.

(21) Appl. No.: 12/684,382

(22) Filed: Jan. 8, 2010

(65) Prior Publication Data

US 2010/0108224 A1 May 6, 2010

Related U.S. Application Data

(62) Division of application No. 11/584,600, filed on Oct. 23, 2006, now Pat. No. 7,669,628.

(30) Foreign Application Priority Data

Oct. 24, 2005 (JP) .................................. 2005-308882
Dec. 6, 2005 (JP) .................................. 2005-352437

(51) Int. Cl.
| | |
|---|---|
| B29D 30/06 | (2006.01) |
| B29D 30/00 | (2006.01) |
| B60C 5/14 | (2006.01) |
| B60C 5/12 | (2006.01) |
| B60C 5/00 | (2006.01) |
| B60C 19/00 | (2006.01) |

(52) U.S. Cl. ..................... 152/510; 152/450; 156/110.1; 156/123; 156/153

(58) Field of Classification Search .................. 152/450, 152/510; 156/110.1, 123, 153
See application file for complete search history.

(56) References Cited

U.S. PATENT DOCUMENTS

| | | | |
|---|---|---|---|
| 6,309,494 B1 * | 10/2001 | Koch et al. ..................... 156/153 |
| 7,669,628 B2 * | 3/2010 | Yukawa ......................... 152/510 |
| 2005/0098251 A1 | 5/2005 | Yukawa | |
| 2005/0155686 A1 | 7/2005 | Yukawa et al. | |
| 2005/0161138 A1 | 7/2005 | Yukawa et al. | |
| 2005/0205183 A1 | 9/2005 | Yukawa | |
| 2005/0217777 A1 | 10/2005 | Yukawa et al. | |

FOREIGN PATENT DOCUMENTS

| | | |
|---|---|---|
| EP | 1006010 A2 | 6/2000 |
| EP | 1253025 A2 | 10/2002 |
| EP | 1510366 A1 | 3/2005 |
| EP | 1529665 A1 | 5/2005 |
| EP | 1577123 A1 | 9/2005 |
| EP | 1659004 A1 | 5/2006 |
| EP | 1728650 A2 | 12/2006 |
| EP | 1745947 A2 | 1/2007 |
| JP | 2003-63208 A | 3/2003 |
| WO | WO-2004/110794 A1 | 12/2004 |

* cited by examiner

*Primary Examiner* — Adrienne C Johnstone
(74) *Attorney, Agent, or Firm* — Birch, Stewart, Kolasch & Birch, LLP

(57) ABSTRACT

A pneumatic tire having a noise damper, a method for manufacturing the same, and a method for fixing the damper to the tire are disclosed. The inner surface of the tread portion of the vulcanized tire is buffed, and the noise damper is fixed to the buffed inner surface, using a double-sided adhesive tape which has specific characteristics such as adhesive force, tensile strength, thickness, cold-resistant property, heat-resistant property and water-resistant property.

3 Claims, 8 Drawing Sheets

METHOD FOR MANUFACTURING LOW NOISE PNEUMATIC TIRE

CROSS REFERENCES TO RELATED APPLICATIONS

This application is a Divisional of application Ser. No. 11/584,600 filed on Oct. 23, 2006, now U.S. Pat. No. 7,669,628, issue Mar. 2, 2010, the entire contents of which are hereby incorporated by reference and for which priority is claimed under 35 U.S.C. §120. This nonprovisional application also claims priority under 35 U.S.C. §119(a) on Patent Application Nos. 2005-308882 and 2005-352437 filed in Japan on Oct. 24, 2005 and Dec. 6, 2005, respectively, the entirety of which is herein incorporated by reference.

BACKGROUND OF THE INVENTION

1. Field of the Invention

The present invention relates to a method for manufacturing a pneumatic tire having a noise damper, more particularly to a method for fixing a noise damper to the inner surface of a vulcanized tire.

2. Background of the Invention

In order to reduce a tire noise generated during running, a noise damper made of a sponge material and disposed in a tire cavity has been proposed, for example, as disclosed in Japanese patent application publication No. 2003-063208.

Such a noise damper prevents or interrupts resonances of the tire cavity, namely, vibrations of the air filled therein. Further, as the damper is adhered to the inside of the tread portion, vibrations of the tread portion can be reduced.

During running, the tread portion is deformed such that the part in the ground contacting patch becomes relatively flat whereas the remaining major part is generally cylindrical. Accordingly, the boundary between the flat part and the cylindrical part has a relatively small radius of curvature. The boundary having such small-radius-curvature moves relatively around the tire axis as the tire rotates. Accordingly, a damper fixed to the inner surface of the tread portion is repeatedly subjected to bending deformation and compressive and tensile strain.

Therefore, the noise damper potentially tends to separate partially from the tire during long-term use or under high-temperature or very cold service conditions.

on the other hand, double-sided adhesive tapes are now widely used in various fields as being a simple and easy way of fixation. But, a long-term use within a pneumatic tire is, for the double-sided adhesive tapes, yet an unknown category of usage, and a method for evaluating the double-sided adhesive tapes suitable for tires is not yet established.

SUMMARY OF THE INVENTION

It is therefore, an object of the present invention to provide a method for manufacturing a pneumatic tire having a noise damper, in which the noise damper can be stably and tightly fixed to the inner surface of the tread portion by the use of a double-sided adhesive tape selected according to new criteria.

According to the present invention, a method for manufacturing a pneumatic having a noise damper comprises the steps of: preparing a vulcanized tire; buffing the inner surface of the tread portion of the tire; and fixing a noise damper to the buffed inner surface by the use of an double-sided adhesive tape, wherein
the noise damper is made of a sponge material having a specific gravity of 0.005 to 0.060, and
the double-sided adhesive tape has an adhesive force in a range of not less than 1.8 Newton/20 mm tape width when measured according to a T-shape separation test at 25 degrees C.

As a result of researches and studies made by the inventor, new criteria for the double-sided adhesive tape was established. According thereto, the double-sided adhesive tape has to possess at least an adhesive force within the above-mentioned range, and it is desirable that the following conditions are satisfied furthermore:

(1) the double-sided adhesive tape has a cold-resistant property such that, when the tape undergoes a 90-degree slide bending test at −35 degrees C., the double-sided adhesive tape is not broken and does not separate from the objects, namely the noise damper and tire rubber;

(2) the double-sided adhesive tape has a heat-resistant property such that when the tape undergoes a T-shape separation test at 120 degrees C., the double-sided adhesive tape is not broken and does not separate from the objects, and as a result, a cohesion failure is caused in the noise damper; and (3) the double-sided adhesive tape has a water-resistant property such that when the tape undergoes a T-shape wet separation test, the double-sided adhesive tape is not broken and does not separate from the objects, and as a result, a cohesion failure is caused in the noise damper.

Further, it was also found as being preferable that:

(4) the double-sided adhesive tape has a tensile strength of at least 10 Newton/10 mm-width;

(5) the double-sided adhesive tape has a thickness of at most 0.38 mm; and (6) the double-sided adhesive tape has two layers of different pressure sensitive adhesives, one suitable for the tire rubber, and the other suitable for the noise damper.

** Definitions

* T-Shape Separation Test

In this specification, T-shape separation test is defined as follows.

First, a test specimen TP is made as shown in FIG. 7, wherein a sponge strip 4S materially same as the noise damper is adhered to one side 5a of the double-sided adhesive tape 5, and a rubber strip 9S materially same as the inner surface layer of the tire is adhered onto the other side 5b.

The surface of the rubber strip 9S has a smooth surface whose ten-point average roughness RZ (Japanese Industrial Standard B0601) is at most 10 (micrometer), and the surface is cleaned up with a detergent and dried out before adhered.

In order that the sheets 4S and 9S wholly adhere to the adhesive tape, a rubber roller is reciprocated two times on each sheet at a speed of 300 mm/minutes with a load of 10 kg, and then the test specimen TP is aged 72 hours at room temperature.

The size of the sponge strip 4S is 10 mm in thickness, 20 mm in width and 120 mm in length. The size of the rubber strip 9S is 1 mm in thickness, 20 mm in width and 120 mm in length. The width of the double-sided adhesive tape 5 is 20 mm, and the length is 80 mm. A non-adhered part M of 20 mm length is formed in each end portion of the test specimen TP.

The test specimen TP is attached to a tensile testing machine in a form of "T" as shown in FIG. 8, and the sheets 4S and 9S in one of the non-adhered parts M are pulled towards opposite directions at a speed of 300 mm/minute.

The tension (N) when either the sheet 4S or 9S start to separate from the double-sided adhesive tape 5 is measured.

* T-Shape Separation Test at 25 Degrees C.

This test means literally the T-shape separation test be carried out at about 25 degrees C. To be precise, the T-shape separation test is carried out, using the test specimen having a normal temperature of 25 degrees C. with a tolerance of plus/minus 2 degrees C.

* T-Shape Separation Test at 120 Degrees C.

This test means that the T-shape separation test is carried out, using the heated test specimen. To be specific, the test specimen is put in an oven of 120 degrees C. with a tolerance of plus/minus 2 degrees C. so as to be heated to the temperature. Then, the test specimen is took out therefrom, and the T-shape separation test is carried out at normal room temperature, using the hot test specimen within 2 minutes after took out.

*T-Shape Wet Separation Test Means

This test means that the T-shape separation test is carried out, using the wet test specimen. The test specimen TP is soaked in water for 72 hours. Then, the test specimen is took out, and the T-shape separation test be carried out, using the wet test specimen within 2 minutes after took out.

* 90-Degree Slide Bending Test 90-degree slide bending test is defined in this specification as follows. In this test, a test specimen TP as described above and a test table M are used. As shown in FIG. 9, the test table M has two smooth flat faces (a horizontal face P1 and a vertical face P2) which are perpendicular to each other, and a corner CP therebetween is rounded by a radius R of 1 mm. The test specimen TP is first placed on one of the two faces so that the rubber strip 9S contacts with the flat face.

Only the both ends of the rubber strip 9S are gripped with chuck, clamp or the like. Then, the test specimen TP is slid on the above-mentioned one of the flat faces to the other through the corner CP, keeping the contact of the rubber strip 9S with the faces. The speed TP to pass through the corner CP is 2 cm/sec. After the adhesive tape 5 completely passes through the corner CP, the test specimen TP is visually checked whether the adhesive tape 5 is separated or not, whether the sponge strip 4S is broken or not.

* 90-degree Slide Bending Test at −35 Degrees C.

This test means the 90-degree slide bending test be carried out using the frozen test specimen.

To be specific, the test specimen is put in a freezing chamber at −35 degrees C. with a tolerance of plus/minus 2 degrees C. for one hour. Then, the test specimen is took out therefrom, and the 90-degree slide bending test is carried out at normal room temperature using the cold test specimen within 2 minutes after took out.

* Specific Gravity

The specific gravity of the sponge material is determined based on the apparent density measured according to the Japanese Industrial Standard K6400 "Soft urethane foam test method". Para. 5 "Apparent density".

Other and further objects, features and advantages of the invention will appear more fully from the following description.

BRIEF DESCRIPTION OF THE DRAWINGS

Embodiments of the present invention will now be described in detail in conjunction with the accompanying drawings.

DETAILED DESCRIPTION OF THE ILLUSTRATED EMBODIMENTS

Figure 1:
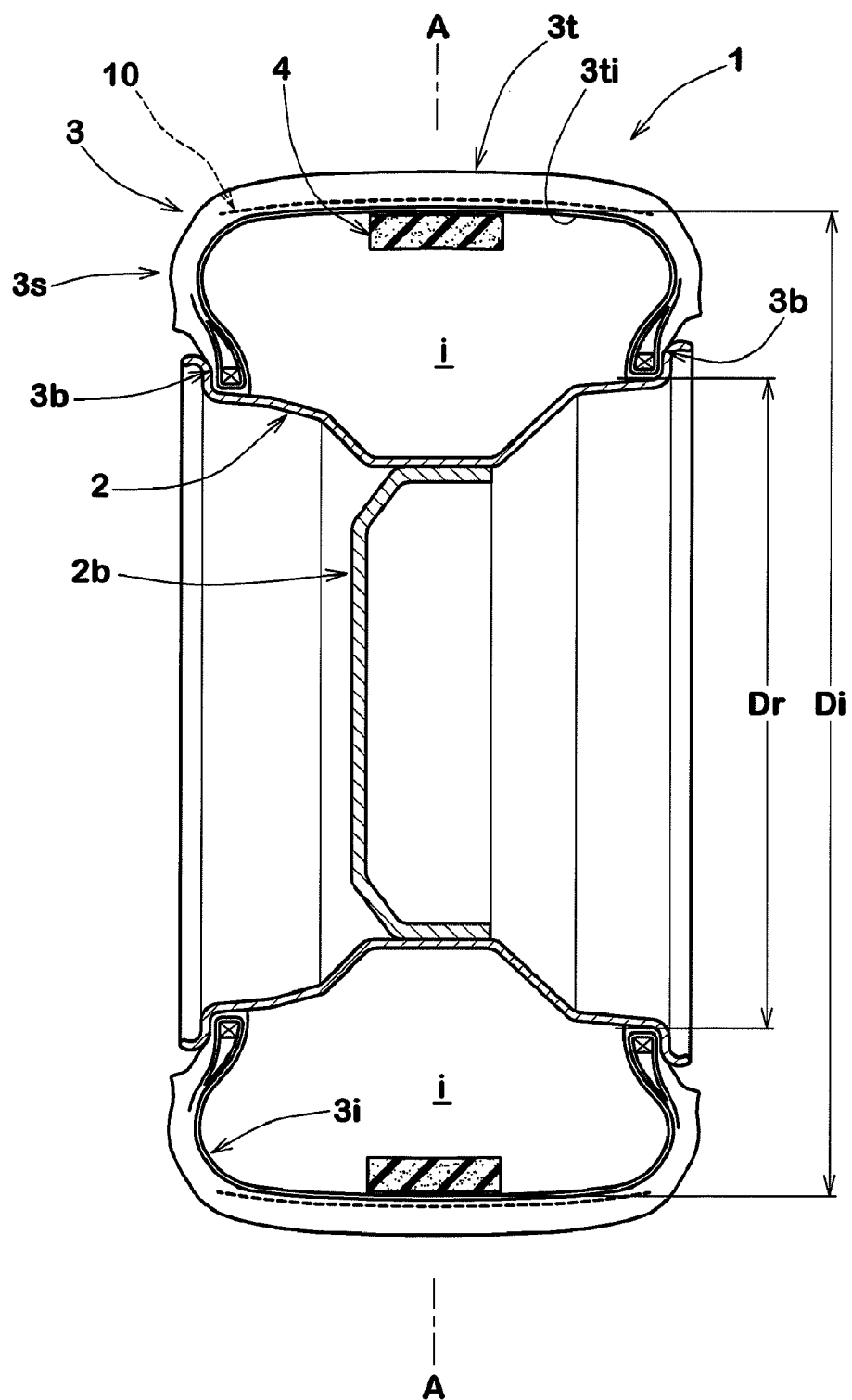
FIG. 1 is a cross sectional view of an assembly of a wheel rim and a pneumatic tire with a noise damper according to the present invention.

According to the present invention, a pneumatic tire 3 has a troidal hollow body comprising a tread portion 3t, a pair of axially spaced bead portions 3b and a pair of sidewall portions 3s extending between the tread edges and the bead portions 3b, and the tire is provided in the hollow with a noise damper 4. As usual, the hollow body includes the following reinforcing structures: a bead core 11 disposed in each of the bead portions 3b; a carcass 6 extending between the bead portions 3b through the tread portion 3t and sidewall portions 3s; and a belt 10 disposed radially outside the carcass 6 in the tread portion 3t.

The inner surface layer of the tire is made of an air-impermeable rubber compound. Usually, an innerliner 9 separate from the carcass 6 is disposed to cover the inner surface 3i of the tire. But, it may be possible to use the carcass topping rubber as an airtight rubber layer instead of using the separate innerliner.

In this embodiment, the pneumatic tire 3 is a radial-ply tire for passenger cars, and the noise damper 4 is adhered to the inner surface 3ti of the tread portion 3t.

The tire 3 is mounted on a wheel rim 2 and the tire hollow forms a closed cavity (i) to be filled with air. The noise damper 4 is confined within the tire cavity.

The wheel rim 2 comprises: a pair of bead seats for tire beads; a pair of flanges extending radially outwardly from the bead seats; and a rim well between the bead seats for tire mounting operation. In this example, the wheel rim is fixed to a centersection (spoke or disk) 2b attached to the vehicle's axle to form a two-piece wheel. Of course the rim may be a part of a one-piece wheel. The wheel rim may be a specially-designed rim, but in this embodiment, a standard wheel rim is used.

Here, the standard wheel rim is a wheel rim officially approved for the tire by standard organization, i.e. JATMA (Japan and Asia), T&RA (North America), ETRTO (Europe), STRO (Scandinavia) and the like. The undermentioned standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 200 kPa and 88% of the maximum tire load, respectively.

The above-mentioned carcass 6 is composed of at least one ply 6A of cords arranged radially at an angle in the range of from 70 to 90 degrees with respect to the tire equator C, extending between the bead portions through the tread portion and sidewall portions, and turned up around the bead core 11 in each bead portion from the axially inside to the axially outside of the tire to form a pair of turnup portions 6b and a main portion 6a therebetween. In this embodiment, the carcass 6 is composed of a single ply 6A of organic fiber cords arranged radially at an angle of 90 degrees with respect to the tire equator C.

Between each of the turned up portions 6b and the main portion 6a, a bead apex 8 made of a hard rubber compound is disposed to reinforce the bead portion and sidewall lower portion. The bead apex 8 extends radially outwardly from the bead core while tapering to its radially outer end.

The belt comprises a breaker 10 and optionally a band. In this embodiment, the belt consists of a breaker 10.

The breaker 10 comprises at least two cross plies: a radially inner ply 10A and a radially outer ply 10B, each made of steel cords laid at an angle of about 10 degrees to about 35 degrees with respect to the tire equator C. Each of the two cross plies extends across almost entire width of the tread portion 3t.

The band is usually disposed on the radially outside of the breaker 10 to improve the high-speed durability of the tread portion. The band has a so called jointless structure formed by spirally winding at least one cord at an angle of not more than 5 degrees with respect to the tire equator.

The innerliner 9 is disposed on the inside of the carcass 6 to cover substantially entire inner surface of the tire. The innerliner 9 is made of an air-impermeable rubber compound which contains at least 60 parts by weight of butyl rubber with respect to 100 parts by weight of all the rubber component. Preferably, the butyl rubber content is at least 70 parts by weight, more preferably at least 80 parts by weight, and at the maximum, 100 parts by weight. Further, halogenated butyl rubber can be included as the butyl rubber.

In the case that the butyl rubber content is less than 100 parts by weight, as the rest of the rubber component, diene rubber, e.g. natural rubber, butadiene rubber, styrene-butadiene rubber, isoprene rubber, chloroprene rubber, acrylonitrile butadiene rubber and the like can be included.

As usual, the air-impermeable rubber compound may further contain various additives, for example, vulcanizing agent, vulcanization accelerator, antidegradant, reinforcing filler, and the like.

In this example, the innerliner rubber comprises 70 PHR of butyl rubber, 30 PHR of natural rubber, 60 PHR of carbon black and additives.

Figure 4:
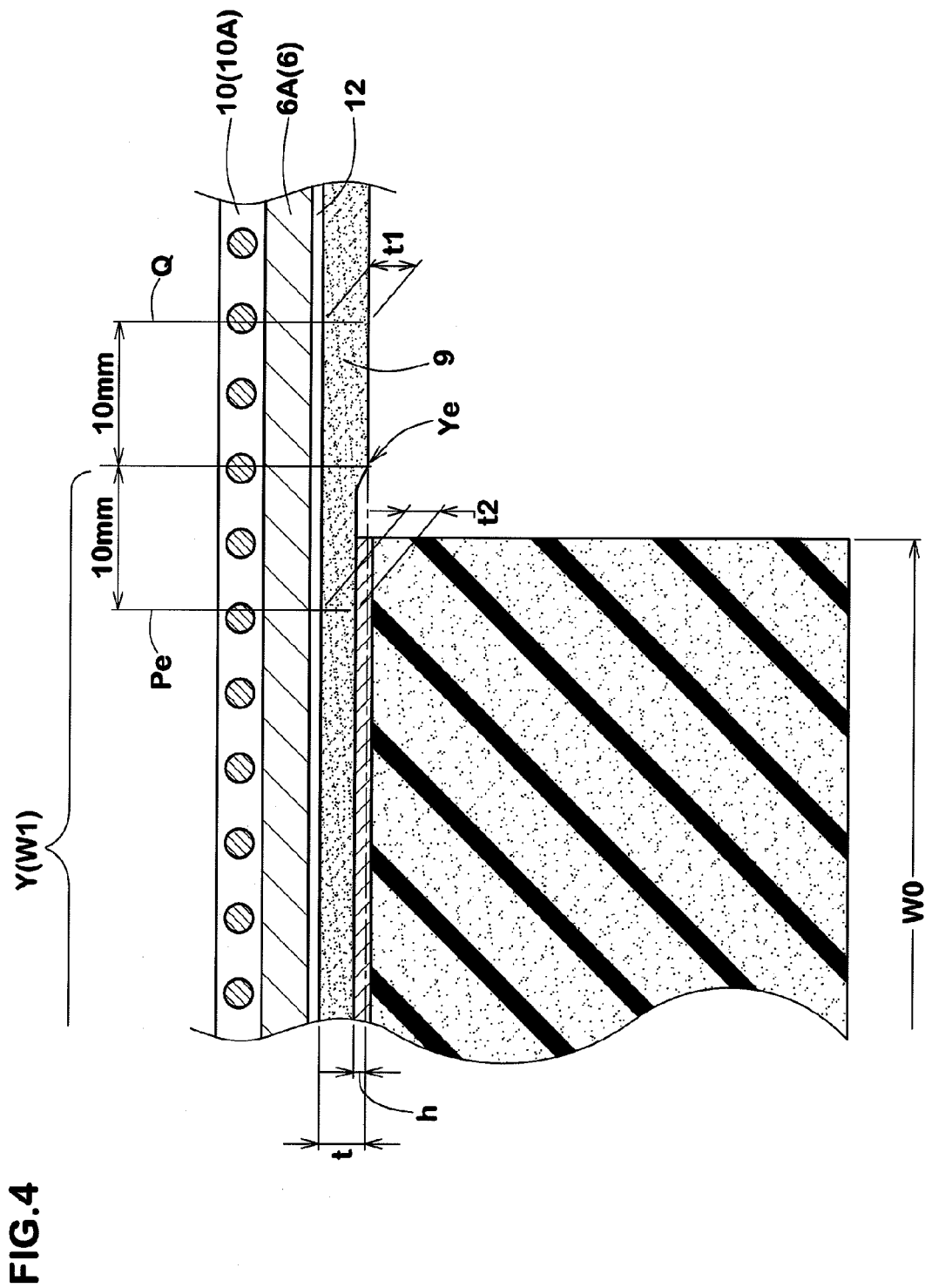
FIG. 4 is an enlarged cross sectional view of the buffed surface.
Figure 5:
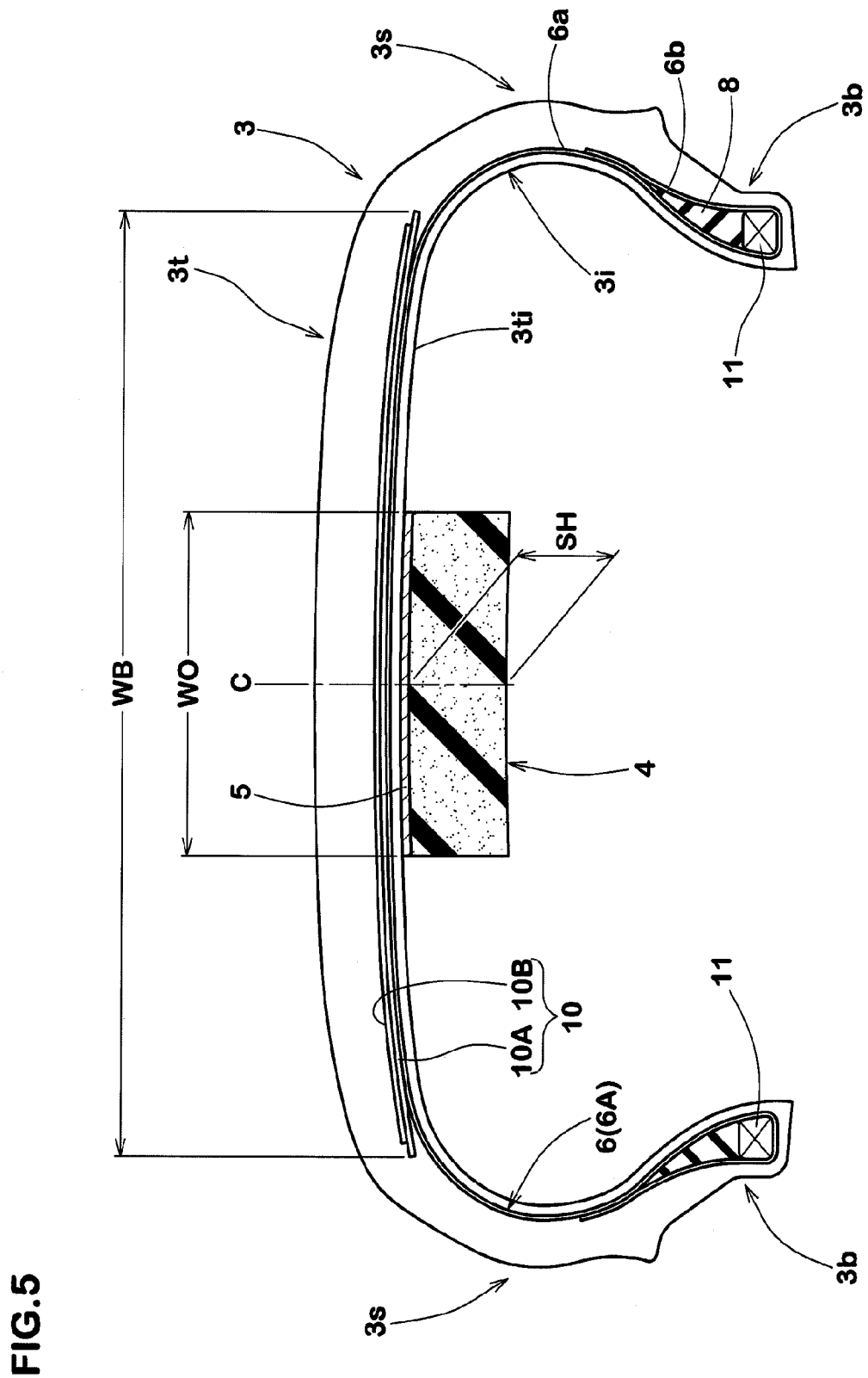
FIG. 5 is a cross sectional view of the pneumatic tire to which the noise damper is adhered.

In order to further increase the adhesion between the innerliner 9 and the carcass topping rubber, an intermediate layer 12 can be disposed therebetween as shown in FIG. 4, wherein, to be superior in adhesion to both of the carcass topping rubber and the innerliner rubber, the intermediate layer 12 is made of a rubber compound containing at least 70 parts by weight of diene rubber (especially preferably natural rubber) with respect to 100 parts by weight of the rubber component, and the layer 12 has a thickness of at most 1.0 mm.

\* Noise Damper

The noise damper 4 is fixed to the inside of the tread portion. Accordingly, to deform easily during running and not to affect the running performance such as steering stability, the material of the damper must be a light-weight low-density flexible material, e.g. formed rubber, foamed synthetic resins, cellular plastics and the like. In the case of foamed materials (or sponge materials), an open-cell type and a closed-cell type can be used, but an open-cell type is preferred. For example, synthetic resin sponges such as ether based polyurethane sponge, ester based polyurethane sponge, polyethylene sponge and the like; rubber sponges such as chloroprene rubber sponge (CR sponge), ethylene-propylene rubber sponge (EDPM sponge), nitrile rubber sponge (NBR sponge) and the like can be used.

Especially, polyethylene sponge, polyurethane sponges including ether based polyurethane sponge and the like are preferably used in view of noise damping effect, lightness in weight, easy control of expansion rate and durability.

In this embodiment, an open-cell type sponge material, more specifically, polyurethane foam is used.

Depending on the environment where the tire is used, there is a possibility that the air which fills the tire cavity (i) to inflate the tire is humid and the water makes condensation in the closed cavity (i). Accordingly, sponge materials which are hard to be hydrolyzed such as ether based polyurethane are suitably used.

Further, in order to prevent water from penetrating into the noise damper, a water repellent treatment can be preferably made on the sponge material. Also, a mildewproof treatment can be preferably made.

Furthermore, in order to avoid poison in the emission gas generated when incinerating scrap tires, it is preferred that raw materials not including halogen are used to make the sponge material.

By disposing a certain volume of the sponge material in the tire cavity (i), resonances of the air in the cavity can be controlled and vibrations of the tread portion is reduced. Therefore, noise generated from the tire during running can be reduced.

If the specific gravity of the sponge material is less than 0.005 or more than 0.06, it becomes difficult to control the cavity resonance. Therefore, the specific gravity is not less than 0.005, preferably not less than 0.010, more preferably not less than 0.016, but not more than 0.060, preferably not more than 0.05, more preferably not more than 0.045.

If the volume V2 of the noise damper 4 is less than 0.4% of the volume V1 of the tire cavity, it is difficult to reduce the noise sound level recognizably. If the volume V2 is more than 20% of the volume V1, it becomes difficult to maintain the tire weight balance. Therefore, the volume V2 of the sponge material of the noise damper 4 is at least 0.4%, preferably not less than 1.0%, more preferably not less than 2.0%, still more preferably not less than 4.0%, but not more than 20%, preferably not more than 10% of the volume V1 of the tire cavity.

In the case that two or more noise dampers 4 are disposed in the tire cavity, the above-mentioned volume V2 means the total volume of all the noise dampers in the tire.

The volume V1 of the tire cavity 4 is measured under the normally-inflated unloaded state of the tire. Here, the normally-inflated unloaded state of the tire is such that the tire is mounted on the wheel rim and inflated to the standard pressure but loaded with no tire load.

Incidentally, the volume V1 of the cavity (i) can be obtained by the following approximate expression (1):

$$V = A \times \{(Di-Dr)/2 + Dr\} \times pi$$

wherein

"A" is the cross sectional area of the cavity (which can be obtained by computed tomography scan for example), "Di" is the maximum diameter of the cavity, "Dr" is the wheel rim diameter, and "pi" is the circle ratio.

These parameters are measured under the normally-inflated unloaded state of the tire.

Figure 2:
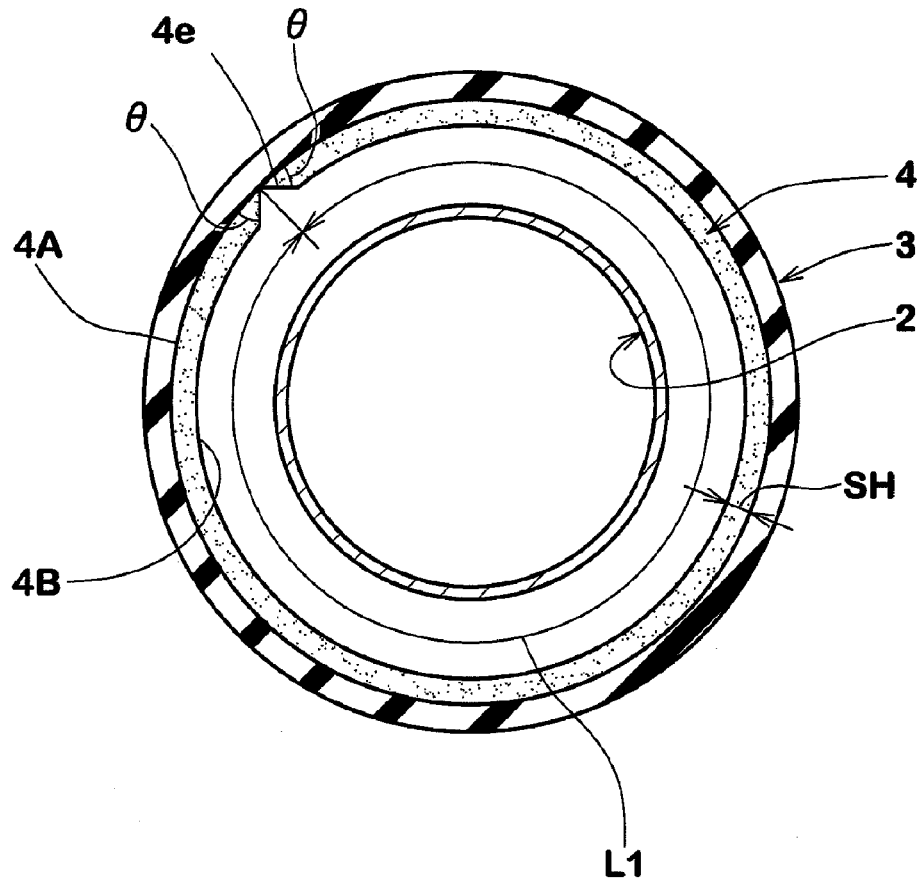
FIG. 2 is a schematic cross sectional view of the assembly taken along a line A-A of FIG. 1.

In view of the radial force variation, radial run out and the like, it is preferable that the noise damper 4 has a substantially constant cross sectional shape along the entire circumferential length thereof except for the end portions 4e of the damper 4. In the case that the ends of the damper are not connected to each other, it is preferable that the end portions 4e are tapered as shown in FIG. 2 to prevent friction therebetween.

Further, in order to prevent leaning of the damper 4 during high speed running, the height SH of the noise damper 4 is preferably not more than 50 mm, more preferably not more than 30 mm, still more preferably not more than 25 mm, but not less than 10 mm, more preferably not less than 15 mm. Here, the height SH is measured perpendicularly to and from the tire inner surface 3ti to the extreme end of the noise damper 4 under the condition that the tire is not yet mounted on the rim.

As to the cross sectional shape of the noise damper, a symmetrical shape is preferred because, if the cross sectional shape is asymmetrical, due to the difference in the lateral stiffness (rigidity) between the right-hand side and the left-hand side of the damper, the damper is liable to lean during running, especially during high-speed running, and the balance of the tire alters.

In the case of a single noise damper 4 having a symmetrical cross-sectional shape, it is preferable that its center is aligned with the tire equator C, whereby an eccentric load on the noise damper 4 is minimized to prevent the damper from leaning.

Figure 6:
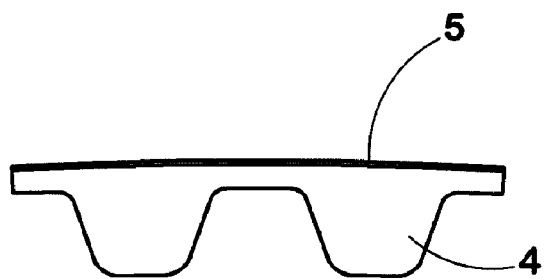
FIG. 6 is a cross sectional view of another example of the noise damper.

The cross sectional shape in this example is a rectangle (width W0=70 mm, height SH=30 mm), but various shapes, e.g. trapezoid, triangle, semicircle, parabolic/bullet shape etc., can be used. Further, a symmetrical shape having two humps as shown in FIG. 6 can be used.

* Double-Sided Adhesive Tape

The noise damper 4 is fixed to an inner surface of the tread portion, using a double-sided adhesive tape 5.

Figure 7:
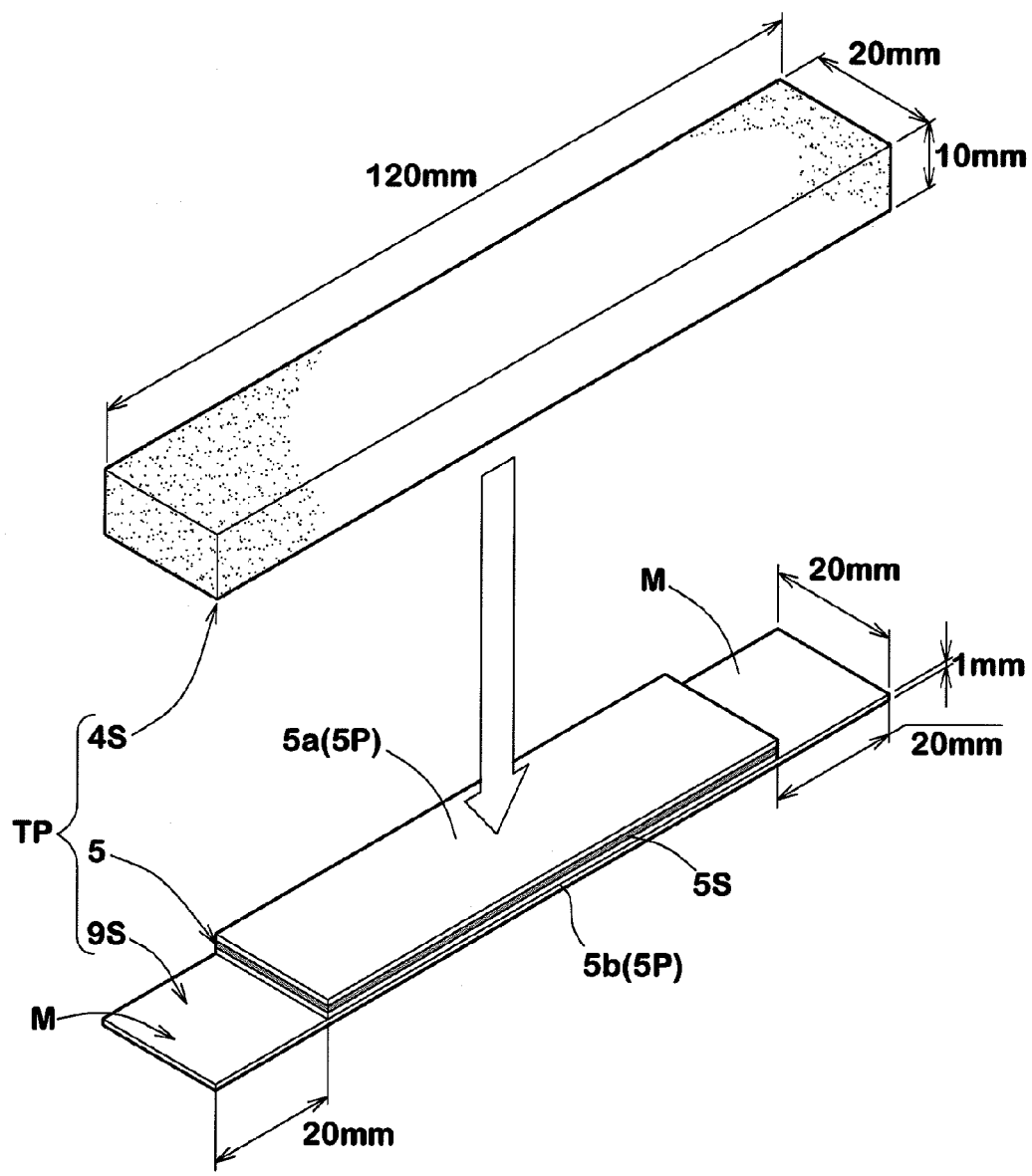
FIG. 7 is an exploded perspective view of a test specimen used for evaluating adhesive properties of the double-sided adhesive tape.
Figure 8:
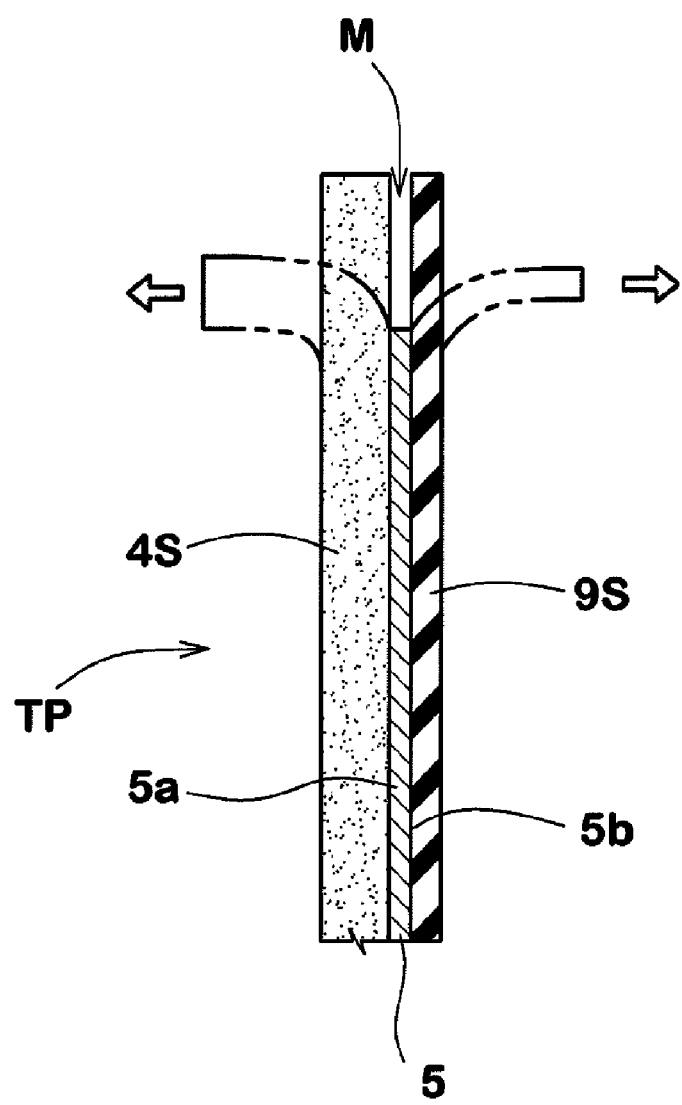
FIG. 8 is a diagram for explaining the T-shape separation test.
Figure 9A:
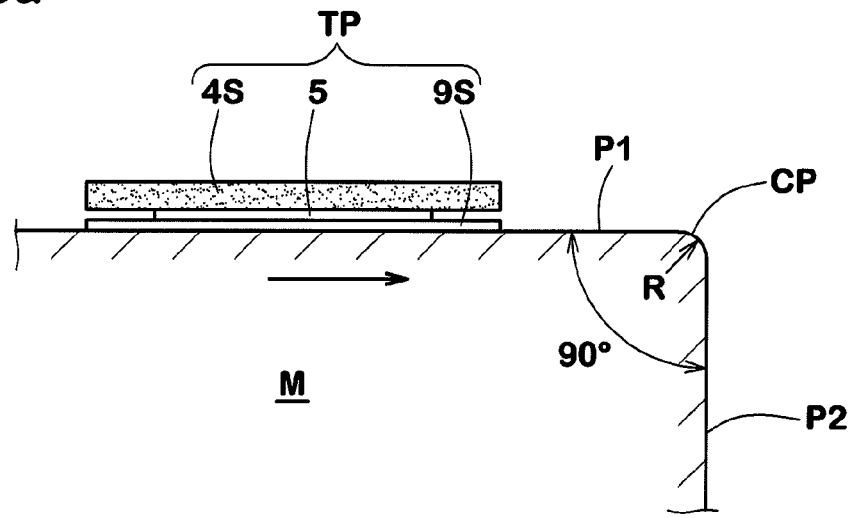
FIGS. 9a, 9b and 9c are diagrams for explaining the 90-degree slide bending test.
Figure 9B:
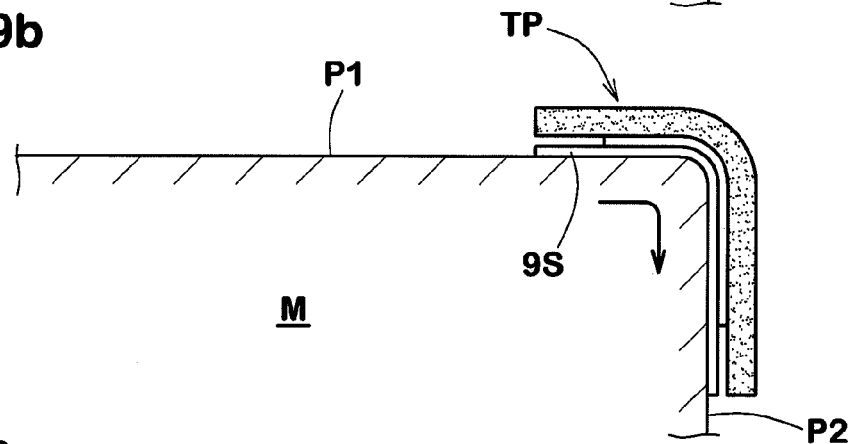
Figure 9C:
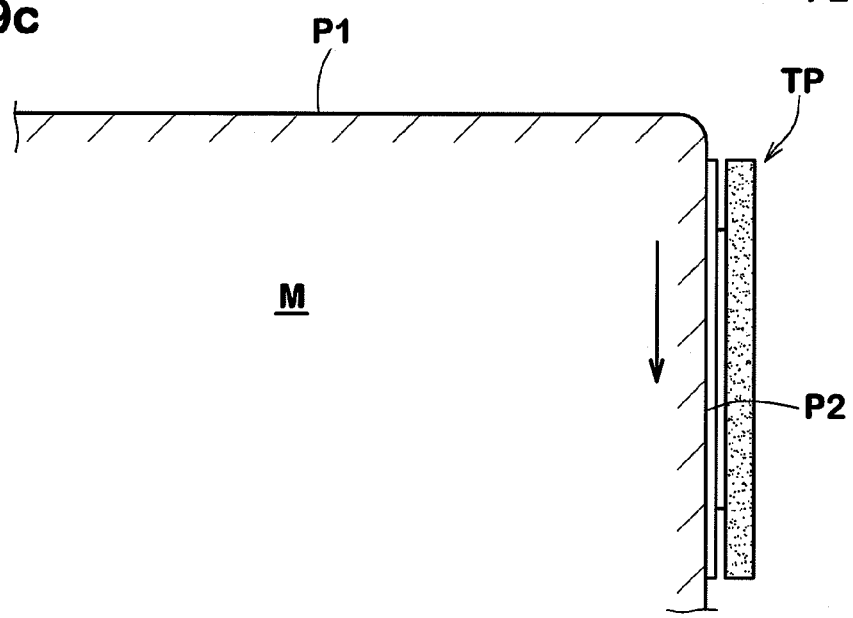

As to the double-sided adhesive tape 5,
(1) a tape having a base tape 5S with a coat 5P or layer of an adhesive material on one side 5a and a coat 5P or layer of an adhesive material on the other side 5b as shown in FIG. 7,
(2) a tape having no base tape and made up of only double layers 5P of different adhesive materials, and
(3) a tape made up of only a single layer 5P of an adhesive material can be used.

The base tape 5S is, for example: plastic film such as polyester; sheet of plastic foam such as acrylic foam; non-woven fabric or bonded material; a woven textile; and the like.

As to the adhesive material, for example, a rubber-based adhesive comprising natural rubber and/or synthetic rubber and additives, e.g. tackifier, softener, age resistor and the like; an acrylic pressure sensitive adhesive comprising a plurality of copolymers of an acrylic ester and a polyfunctional monomer having different glass-transition temperatures (containing pressure sensitive adhesives of high heat resistant type, flame resistant type and low-temperature adhesion type); a silicone pressure sensitive adhesive comprising a silicone rubber and a resin; a polyether adhesive; a polyurethane adhesive and the like can be suitably used.

The use of a thermosetting adhesive comprising a thermosetting resin, e.g. epoxy resin or the like is not preferred in view of the production efficiency because the adhesive needs to be heated up to about 130 degrees C. for about 30 minutes.

As to the adhesive materials, it is possible to use the same adhesive material, but, it is desirable to use different types of adhesive materials in the above case (1) or (2). For example, a rubber adhesive which adheres strongly to the tire rubber, and an acrylic pressure sensitive adhesive which adheres strongly to the noise damper are used on the respective sides.

In order to prevent the noise damper 4 from separating from the tire inner surface 3ti even under severe service conditions, a quantitative study was made on the adhesive force. As a result, it was discovered that separation failures occurring under normal running conditions is preventable if the adhesive force shows a value not less than 1.8 Newton/20 mm-width when measured according to the T-shape separation test, using a test specimen TP which is as shown in FIG. 7, made up of a double-sided adhesive tape 5, a strip 4S of the sponge material applied to one side of the tape, and a strip 9S of the innerliner rubber applied to the other side of the tape.

It is however, preferable that the adhesive force is at most 7.0 Newton/20 mm-width in order that the tape can be removed together with the noise damper if the damper is broken for any reason.

It is especially preferable that the strip 4S of the sponge material is broken prior to separating from the tape 5 when the T-shape separation test at 25 degrees C. is carried out. Namely, the adhesive force at 25 degrees C. is not less than 2.7 Newton/20 mm-width, preferably not less than 3.3 Newton/20 mm-width.

On the other hand, for preventing the adhesive tape 5 from being cracked due to hardening under low temperature conditions, it is desirable that cracks visible to the naked eye and separation do not occur when the 90-degree slide bending test at −35 degrees C. is carried out.

Further, for preventing the adhesive force from decreasing due to softening of the adhesive material under high temperature conditions, it is desirable that the strip 4S of the sponge material is broken prior to separating from the tape 5 when the T-shape separation test at 120 degrees C. is carried out.

Furthermore, for preventing the adhesive force from decreasing due to water penetrating into the noise damper 4, it is desirable that the strip 4S of the sponge material is broken prior to separating from the tape 5 when the T-shape wet separation test is carried out.

The durability of the double-sided adhesive tape 5 has a tendency to decrease as the thickness increases. The tread portion is subjected to a relatively large bending deformation at the circumferential ends of the ground contacting patch. Accordingly when the tape is thick, the sharing stress between the tape and the tire inner surface becomes large, and a cohesion failure of the adhesive material layer tends to occur. Therefore, it is preferable that the thickness of the double-sided adhesive tape 5 is not more than 0.38 mm.

For the base tape 5S of such thin tape, a flexible material such as acrylic foam is preferably used.

In order to replace the damaged noise damper, or to recycle the used tire for example, it is desirable that the noise damper 4 can be easily removed from the tire together with the tape. Accordingly, the double-sided adhesive tape 5 is required to have a certain degree of breaking strength.

Therefore, the breaking strength of the double-sided adhesive tape 5 is preferably at least 10 Newton/10 mm-width, more preferably not less than 15 Newton/10 mm-width.

The breaking strength is measured according to Japanese Industrial Standards Z0237 "Testing methods of pressure-sensitive adhesive tapes and sheets".

Incidentally, in case of the adhesive tape having no base tape, it is difficult to remove the tape namely the adhesive material layer(s). Thus, in this view, the use of such tape is not preferable.

\* Manufacturing Method

The pneumatic tire can be manufactured as usual. Namely, raw tire components, e.g. tread rubber, sidewall rubber, bead rubber, bead apex rubber, innerliner rubber, carcass ply, belt plies and the like are assembled into a raw tire, using a tire building drum. The raw tire is put in a vulcanizing mold, and an inflatable bladder is inserted in the tire hollow. On these occasions, a mold lubricant or release agent is applied between the tire and the mold and also between the tire and the bladder. Then, the bladder is inflated, and the tire is heated to vulcanize the tire. After the tire has been vulcanized, the tire is removed from the mold.

As well known in the tire art, the bladders are conventionally provided on the outer surface with vent grooves to remove air between the tire inner surface and bladder. In this embodiment, however, a special bladder whose outer surface has a smooth part devoid of vent grooves and a part provided with vent grooves is used. The position of the smooth part corresponds to the position to which the damper is fixed.

In the next place, in order to remove the mold release agent, an area Y of the tire inner surface to which the noise damper is adhered is buffed. Namely, the surface of the innerliner 9 of the vulcanized tire is buffed annularly along the tire equator. The above-mentioned smooth part of the bladder correspond to the area Y, therefore this area Y is devoid of the ribs resulting from the vent grooves.

To remove the mold release agent completely, the thickness (h) of the surface layer buffed off needs at least 3.0%, preferably 5.0% or more of the original thickness (t) of the innerliner 9. If however, the thickness (h) of the surface layer buffed off is too much, there is a possibility that the airtightness and durability of the innerliner are deteriorated. Therefore, the thickness (h) should be not more than 30% of the original thickness (t), preferably not more than 10.0% in view of the working efficiency and tire production cost.

If it is necessitated to compensate for a possible deterioration of the airtightness owing to the reduced thickness, it is preferred that the butyl rubber content of the innerliner is increased to over 70 parts by weight, more preferably over 80 parts by weight.

Incidentally, in the case of finished tires (if it is difficult to know the original thickness), the thickness (h) of the buffed-off surface layer is determined as the difference $t1-t2$, wherein t2 is the thickness of the buffed innerliner 9 which is defined by the average of values measured at four circumferentially different measuring positions set at each of three axial positions P: a position Pc at the tire equator C; and a position Pe 10 mm axially inward of each of the axial edges Ye of the buffed area Y, namely, the average of values measured at twelve measuring positions, and t1 is the original thickness of the innerliner 9 which is defined by the average of values measured at four circumferentially different measuring positions set at each of two axial positions Q each being 10 mm axially outward of each of the axial edges Ye of the buffed area Y, namely, the average of values measured at eight measuring positions.

The axial width W1 of the buffed area Y is more than the width W0 of the strip of the sponge material, and preferably the difference W1-W0 is at least 5.0 mm.

The buffed area Y is formed within the maximum axial width WB of the belt 7, and preferably the axial distance from each of the axial edges of the belt 10 to the adjacent edge of the buffed area Y is more than 10.0 mm.

In the cross section of the tire, the bending deformation of the tire during running is relatively small under the belt, and the bending deformation becomes increased near the belt edges. Therefore, in order to prevent damages such as cracks in the thickness-reduced area Y of the innerliner 9, it is desirable to provide the axial distance of more than 10.0 mm.

Figure 3:
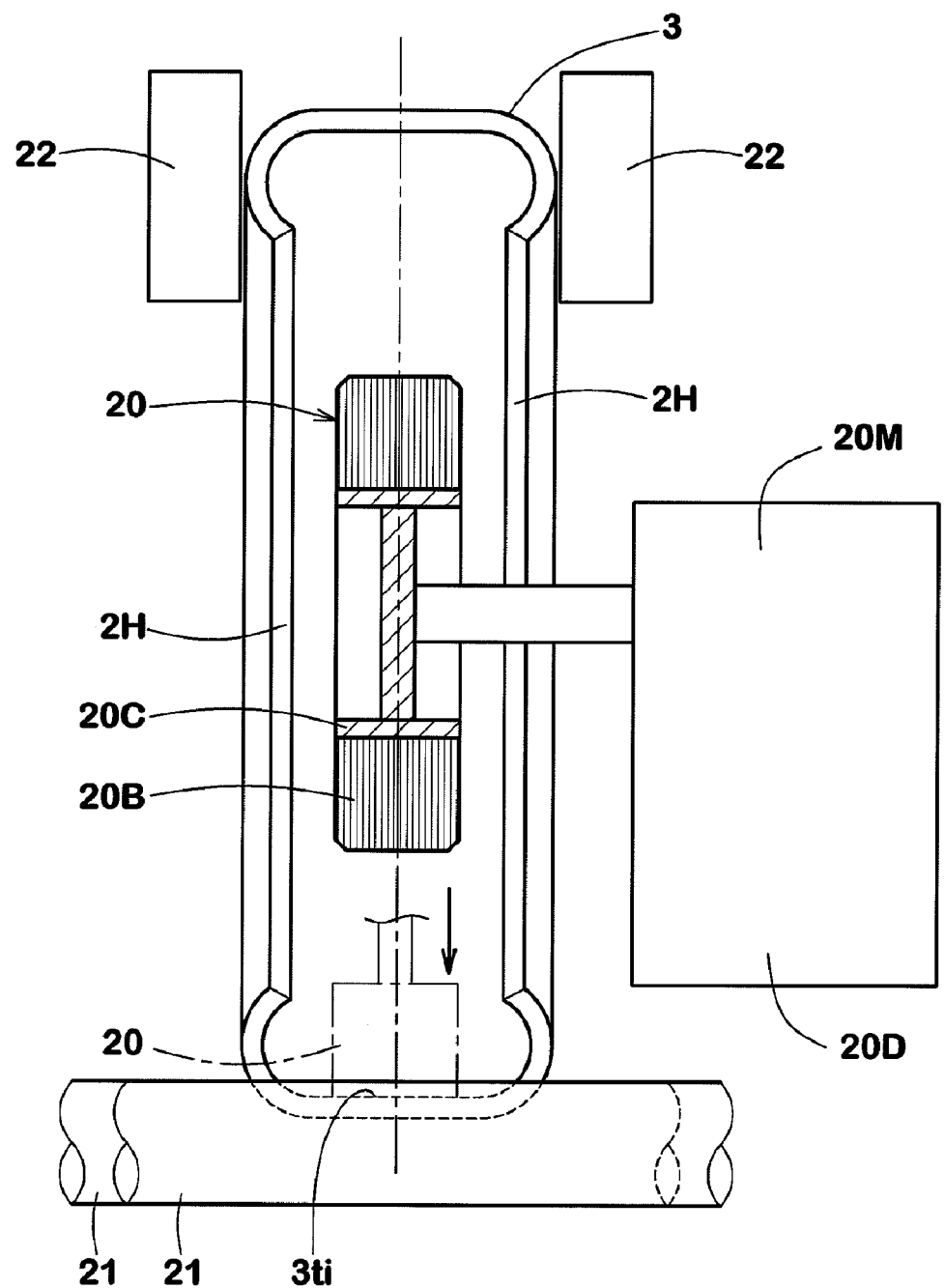
FIG. 3 is a schematic cross sectional view of the tire for explaining a method for buffing the inner surface of the tread portion.

The vulcanized tire removed from the mold is, as shown in FIG. 3, held uprightly and rotatably around its rotational axis by straddling between a pair of horizontal parallel driving rollers 21. To hold the tire uprightly, guide rollers 22 are disposed on each side of the tire. When the power is applied to the driving rollers 21, the two rollers 21 rotate in the same direction, and accordingly the tire is rotated in the reverse direction.

Next, a buffing disk 20 is inserted in the tire hollow through the center hole 2H of the tire.

The tire 1 is rotated by turning on the driving rollers 21, and the buffing disk 20 is moved downward slowly.

At that time, the buffing disk 20 is kept to be freely rotatable by turning off the driving motor 20M of the buffing disk 20. Accordingly, when the outer peripheral surface of the buffing disk 20 comes into contact with the inner surface of the tread portion of the rotating tire, the buffing disk 20 starts to rotate.

By the use of a sensor 20D for detecting the rotation of the buffing disk 20, when the start of the rotation is detected during moving down of the buffing disk 20, the driving motor 20M of the buffing disk 20 is turned on, and the moving down is stopped after the buffing disk 20 is moved downward by a predetermined distance from the position or height at which the buffing disk 20 starts to rotate. As a result, the buffing disk is rotated in the reverse direction to the rotational direction of the tire, and the tire is buffed.

In order to buff evenly, suitably used as the buffing disk 20 is a buffing brush in which metal or synthetic resin bristles 20B are radially fastened into a cylindrical core 20C. Preferably, bristles made of a synthetic resin containing abrasive grains of alumina or silicon carbide are used.

In the case of the buffing brush, clogging is hard to occur, and the bristles are easily curved and moved along the profiled inner surface of the tread portion. As a result, the surface can be evenly buffed off by a small thickness.

The reason for turning on the driving motor 20M of the buffing disk 20 after the buffing disk 20 starts to rotate following the rotated tire, is as follows:

With respect to the position of the inner surface of the tread portion or the inside diameter of the tread portion, the tires have relatively large variations when compared with the thickness of the surface layer to be buffed off.

Further, the outside diameter of the buffing disk 20 also varies in use because of the wear and deformation of the bristles. Therefore, it is important in precisely buffing off the surface layer to determine the reference position, at which the outer peripheral surface of the buffing disk 20 contacts with the inner surface of the tread portion, every time a tire is changed. And, the moving down distance of the buffing disk 20 has to start from this reference position.

In this example, the buffing disk 20 has a width W2 equal to the width W1 of the buffed area Y is used to remove the necessity for moving the buffing disk 20 in the tire axial direction during buffing. Of course, by moving the buffing disk 20 in the tire axial direction, the buffing disk 20 having a narrower width than the buffed area Y can be used.

After the tire makes the predetermined number of turns, the buffing disk 20 is moved up to be detached from the inner surface of the tire, and the driving motor is turned off. The driving rollers 21 are also stopped. The buffing disk 20 is removed from the tire hollow.

Thus, the tire provided in the inner surface of the tread portion with the buffed area Y is produced.

Next, the double-sided adhesive tape 5 satisfying at least one of the above-mentioned conditions (1)-(6) is selected. And the noise damper is fixed to the buffed area Y by the use of the double-sided adhesive tape 5.

Firstly, the double-sided adhesive tape 5 is applied to the noise damper or a strip of the sponge material, and then by removing the released paper from the other side of the tape, the damper is applied to the buffed area Y.

Thus, the tire with the noise damper is produced.

* Comparison Tests

Radial tire of size 215/45R17 (Rim size 17×7JJ) for passenger cars were prepared, and tested for the durability and airtightness of the tire and the adhesion of the damper.

When vulcanizing the tires, an aqueous solution containing silicone and mica powder was used as the mold release agent, and such mold release agent remained on the inner surface of the tire. Therefore, the surface of the innerliner in the tread portion was buffed as shown in Table 1. The noise damper was fixed to the buffed face, using a double-sided adhesive tape.

As the buffing disk, a buffing brush having a diameter of 300 mm was used. The buffing brush had 0.9 mm dia. bristles made of nylon containing silicon carbide grit (TORAYGRIT manufactured by TORAY MONOFILAMENT CO., LTD.: Abrasive grain size 240).

As the noise damper, a strip of ether based polyurethane sponge (INOAC CORPORATION, Product No. ESH2) having a specific gravity of 0.039 was used. The damper had a rectangular cross sectional shape, and the size thereof was 20 mm in height and 97 mm in width.

As the double-sided adhesive tape, a heat-stable tape having a nonwoven base tape and acrylic pressure sensitive adhesive (Ebisu chemical co., Ltd., #700) was used.

1) Durability and Adhesivity Test

Using a tire test drum, the tire mounted on a standard rim was run for 12,000 km at a speed of 80 km/h, under the following conditions:

Inner pressure of 230 kPa
Tire load of 6.2 kN (120% of the tire load limit for 230 kPa specified by JATMA)

After running, the innerliner was checked for damage, and the damper was visually checked whether it adhered thoroughly or not. The results are indicated in Table 1, wherein OK indicates that there was no problem, 1 indicates that the innerliner was cracked, so the carcass cords were exposed, 2 indicates that the small cracks were caused on the surface of the innerliner, 3 indicates that the adhesive tape did not adhere to the inner surface, 4 indicates that the adhesive tape adhered to the inner surface at first, but separated after running.

2) Airtightness Test

The tires mounted on the standard rim and inflated to 230 kPa were put in a hot chamber at 80 degrees C. for 15 days and then the retained pressure was measured. The results are indicated in Table 1, using an index based on Control tire being 100, wherein the larger the index value, the better the airtightness.

TABLE 1

| Tire | Control | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Innerliner | | | | | | | | | | | |
| Butyl rubber content (wt %) | 60 | 60 | 60 | 60 | 60 | 60 | 60 | 60 | 60 | 70 | 80 |
| Original thickness t (mm) | 1.25 | 1.28 | 1.25 | 1.22 | 1.23 | 1.2 | 1.23 | 1.16 | 1.3 | 1.32 | 1.35 |
| Thickness h of Buffed-off surface layer (mm) | 0 | 0.52 | 0.11 | 0.25 | 0.36 | 0.04 | 0.01 | 0.13 | 0.12 | 0.25 | 0.26 |
| h/t (%) | 0 | 40 | 9 | 20 | 29 | 3 | 0.8 | 11 | 9 | 19 | 19 |
| Width W1 of Buffed area Y (mm) | — | 110 | 110 | 110 | 110 | 110 | 110 | 178 | 190 | 110 | 110 |
| Belt width WB (mm) | 178 | 178 | 178 | 178 | 178 | 178 | 178 | 178 | 178 | 178 | 178 |
| Noise damper width W0 (mm) | 97 | 97 | 97 | 97 | 97 | 97 | 97 | 97 | 97 | 97 | 97 |
| Test results | | | | | | | | | | | |
| Durability | OK | *1 | OK | OK | OK | OK | OK | OK | *2 | OK | OK |
| Adhesivity | *3 | OK | OK | OK | OK | OK | *4 | OK | OK | OK | OK |
| Airtightness | 100 | 70 | 98 | 95 | 92 | 99 | 100 | — | — | 102 | 106 |

The invention claimed is:

1. A pneumatic tire comprising
a tread portion having an inner surface and an outer surface defining a ground contacting face,
a pair of sidewall portions,
a pair of bead portions,
a carcass extending between the bead portions through the tread portion and sidewall portions,
a belt disposed radially outside the carcass in the tread portion, and
a noise damper, wherein
the tread portion includes an innerliner of an air-impermeable rubber compound defining said inner surface,
the inner surface is provided with a buffed area, where the thickness (h) of the buffed-off surface of the innerliner is not less than 3% but not more than 30% of the thickness (t) of the innerliner, and the axial distance from each of the axial edges of said belt to the adjacent edge of said buffed area is more than 10.0 mm, and
said noise damper is fixed to the buffed area by the use of a double-sided adhesive tape.

2. A method for fixing a noise damper to an inner surface of a tread portion of a pneumatic tire,
the tire comprising
a tread portion having an inner surface and an outer surface defining a ground contacting face,
a pair of sidewall portions,
a pair of bead portions,
a carcass extending between the bead portions through the tread portion and sidewall portions, and
a belt disposed radially outside the carcass in the tread portion, the method comprising the steps of:
buffing the inner surface of the tread portion; and using a double-sided adhesive tape to fix the noise damper to the buffed inner surface, wherein the tread portion includes an innerliner of an air-impermeable rubber compound defining said inner surface, and in the step of buffing the inner surface of the tread portion, the thickness of the buffed-off surface layer of the innerliner is controlled not to exceed 30% of the thickness of the innerliner, and the axial distance from each of the axial edges of said belt to the adjacent edge of said buffed area is more than 10.0 mm.

3. The method according to claim 2, wherein in the step of buffing the inner surface of the tread portion, the thickness of the buffed-off surface of the innerliner is controlled not to fall below 3% of the thickness of the innerliner.

* * * * *